G. KINGSLAND.
Strawberry-Vine Cutter.
No. 202,951. Patented April 30, 1878.
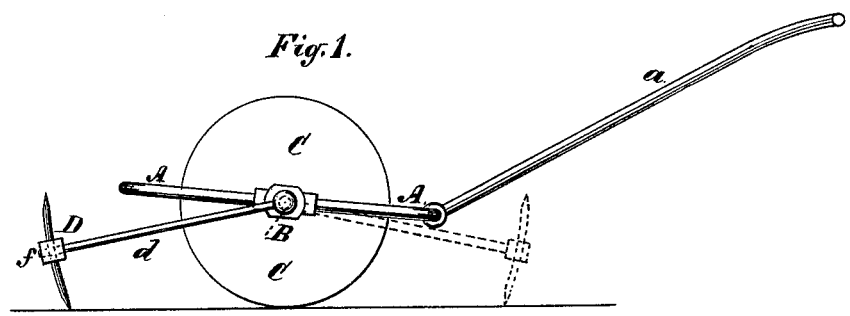
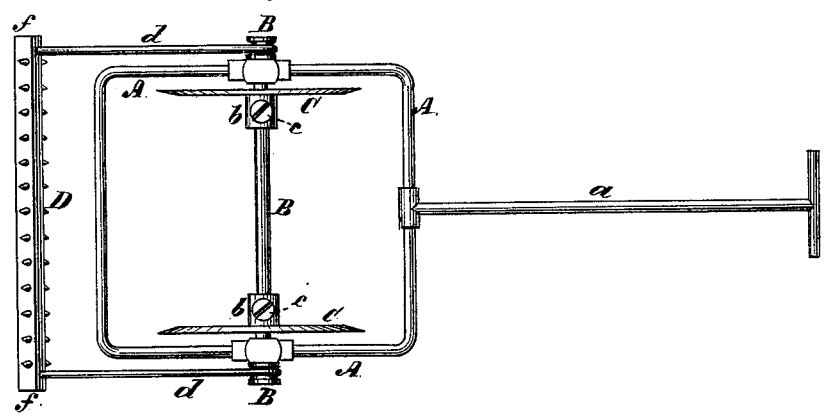
Witnesses:
Henry Eichling
H. Wells Jr
Inventor:
George Kingsland
per James A. Whitney, Atty.

UNITED STATES PATENT OFFICE.

GEORGE KINGSLAND, OF KINGSLAND, NEW JERSEY.

IMPROVEMENT IN STRAWBERRY-VINE CUTTERS.

Specification forming part of Letters Patent No. 202,951, dated April 30, 1878; application filed February 26, 1878.

*To all whom it may concern:*

Be it known that I, GEORGE KINGSLAND, of Kingsland, in the county of Bergen and State of New Jersey, have invented certain Improvements in Apparatuses for Cutting and Cleaning Strawberry-Vines, &c., of which the following is a specification:

This invention is more particularly intended for removing the "runners" from between the rows of strawberry-vines, but it may also be used for analogous purposes with other crops. It comprises certain novel combinations of parts, whereby the runners or other vegetation to be removed are first separated by cutting from that designed to remain as the subject of cultivation, and are then torn or uprooted from the ground, the work being, by this means, accomplished much more rapidly and economically than is possible by the usual methods of hand-labor.

Figure 1 is a side view, and Fig. 2 a plan view, of an apparatus made according to my invention.

A is a frame, provided with a tongue or draft-pole, $a$, and attached to the transverse axle B. On the latter are two sharp-edged wheels or circular cutters, C, the hubs or bosses $b$ of which are provided with set-screws $c$, the cutters B being adjustable at a greater or less distance apart, as may be desired, and fixed upon the axle at the desired points by tightening the set-screws $c$. The axle B is arranged to revolve in suitable bearings in the frame A. Parallel with the axle, and connected therewith by rods $d$, (the latter having pivotal connection with the axle,) is a reversible rake, D. This rake may be either arranged behind the axle, as shown in the drawings, or it may be in front of said axle, as indicated in dotted outline in Fig. 1, the change of position being brought about by throwing the axle and the cutter backward over the rake.

The apparatus may be used either by hand or horse power, as may be preferred. It is drawn between the rows of strawberry-plants, with the cutters adjusted to suitable proximity to said rows. The cutters sink into the earth to a greater or less degree, and in so doing cut or sever the runners or long tendrils of the vines that, extending laterally from the rows, occupy the intervening space, and which ordinarily are uprooted or removed by hand-labor. The runners, being thus severed from the parent plants, are raked up into masses by the rake, and are then removed to any suitable place of deposit. When the apparatus is drawn forward, the rake is placed in rear of the axle and cutters. When the apparatus is moved in a reverse direction, the rake should be placed upon the other or opposite side of the axle and cutters, and in this position is brought under the tongue or draft-pole, with the latter upon or over the head $f$ of the rake, in such position that by bearing downward upon the tongue or draft-pole increased downward pressure may be exerted upon the rake to keep it down to its work in dragging out and gathering the runners, &c., previously separated from the parent plants, as hereinbefore set forth.

What I claim as my invention is—

1. The reversible rake D, connected with the axle B by the rods $d$, in combination with the sharp-edged wheels or circular cutters C on said axle, whereby the apparatus is made capable of use either by drawing or pushing, substantially as herein set forth.

2. The organized apparatus, comprising the sharp-edged wheels or circular cutters C, adjustable on the axle B by means of the set-screws $c$, the reversible rake D, and the frame A, provided with a tongue or draft-pole, the whole combined for use and operation substantially as herein set forth.

GEORGE KINGSLAND.

Witnesses:
H. WELLS, Jr.,
HENRY EIDLING.